April 23, 1946.　　　Y. A. BOUGET　　　2,398,879
MATERIAL HANDLING APPARATUS
Filed Aug. 6, 1943　　　2 Sheets-Sheet 1
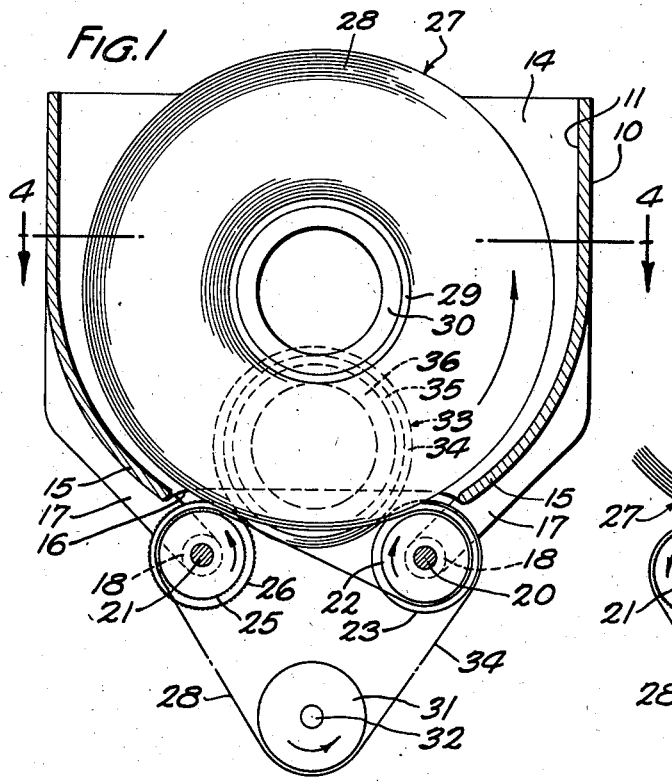
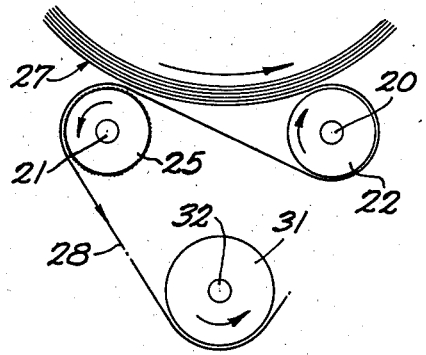
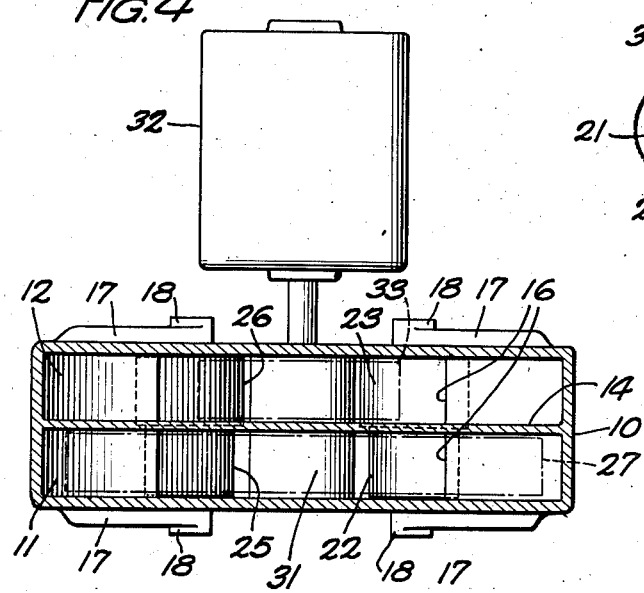
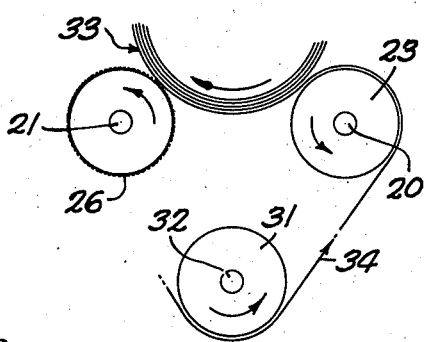
INVENTOR
Y. A. BOUGET
BY E. R. Nowlan
ATTORNEY

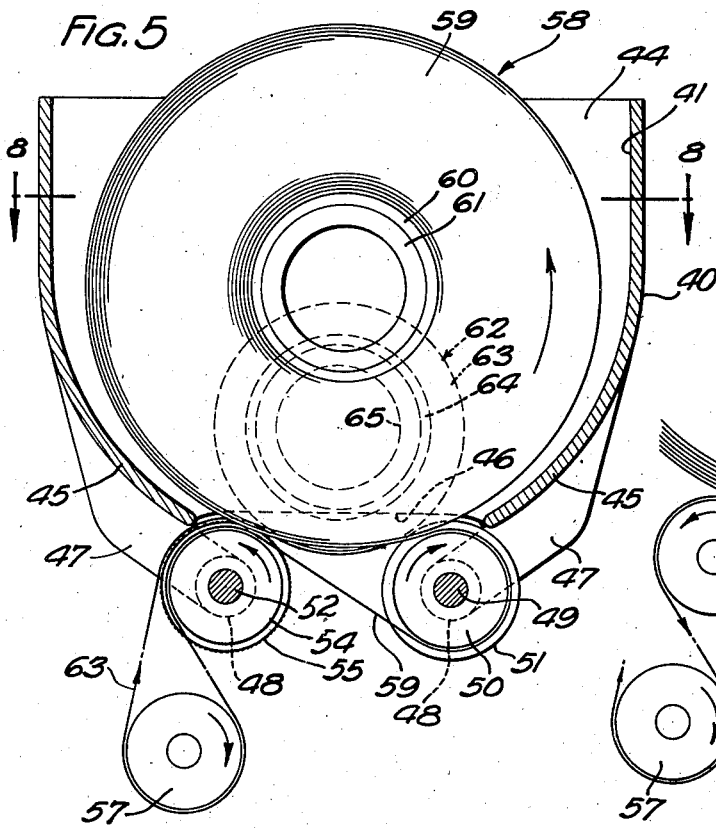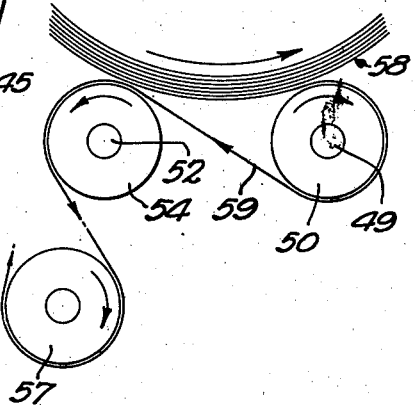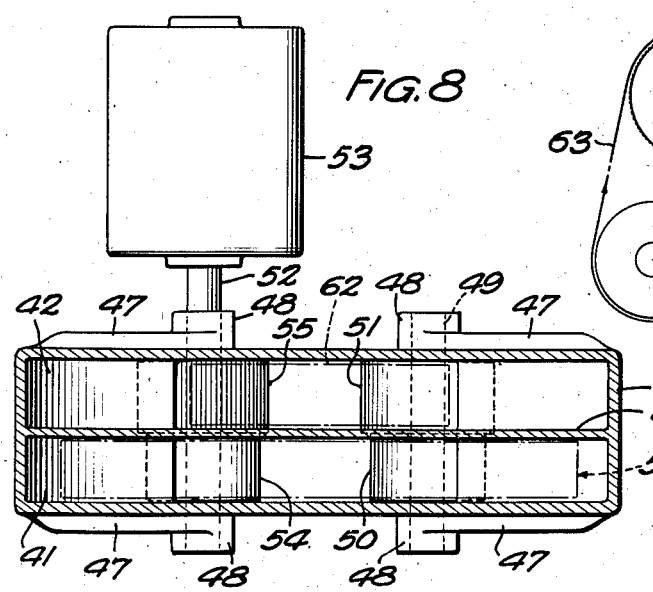

Patented Apr. 23, 1946

2,398,879

UNITED STATES PATENT OFFICE 2,398,879

MATERIAL HANDLING APPARATUS

Yves A. Bouget, West Orange, N. J., assignor to Western Electric Company, Incorporated, New York, N. Y., a corporation of New York Application August 6, 1943, Serial No. 497,677

9 Claims. (Cl. 242—75)

This invention relates to material handling apparatus, and more particularly to apparatus for handling both supply and takeup for material being processed.

It is the usual practice to provide separate structures for the supply and takeup of material processing machines.

An object of the invention is to provide an apparatus which is simple in structure yet highly efficient and practical for handling material including both the supply and takeup sections thereof.

With this and other objects in view, the invention comprises a series of rollers for supporting both the supply and takeup and affected thereby during the travel of the material relative to a processing unit to drive the takeup and to create a given tension on the supply.

Other objects and advantages will be apparent from the following detailed description when considered in conjunction with the accompanying drawings, wherein Fig. 1 is a vertical sectional view of an apparatus constituting one species of the invention;

Fig. 2 is a schematic illustration of a portion of the apparatus showing the travel of the material from the supply to the processing unit;

Fig. 3 is a schematic illustration of another portion of the apparatus showing the travel of the material from the processing unit to the takeup;

Fig. 4 is a lateral sectional view taken along the line 4—4 of Fig. 1 with the supply and takeup shown in dot and dash lines therein;

Fig. 5 is a vertical sectional view of an apparatus constituting another species of the invention;

Fig. 6 is a schematic illustration of a portion of the apparatus of Fig. 5 showing the travel of the material from the supply to the processing unit;

Fig. 7 is a schematic illustration of another portion of the apparatus of Fig. 5 showing the travel of the material from the processing unit to the takeup, and Fig. 8 is a lateral sectional view taken along the line 8—8 of Fig. 5 with the takeup and supply shown in dot and dash lines therein.

Referring now to the drawings, attention is first directed to Figs. 1 to 4 inclusive. In this species of the invention a receptacle 10 of the contour shown in Figs. 1 and 4 includes a supply compartment 11 and a takeup compartment 12 separated by a central partition 14. The lower portion of the receptacle is curved, as at 15, to an open lower end 16, this opening communicating with both compartments 11 and 12. Inwardly projecting lugs 17 provide bearings 18 which are disposed in pairs at each side of the opening 16. Shafts 20 and 21 have their ends rotatably supported in their respective bearings 18. Mounted upon the shaft 20 are smooth-surfaced rollers 22 and 23, these rollers being disposed in registration with the compartments 11 and 12 respectively. The roller 22 is fixed to the shaft 21 while the roller 23 rotates freely thereon. It will be noted that the roller 23 is larger in diameter than the roller 22, the purpose of which will be hereinafter described. Serrated rollers 25 and 26 are mounted upon the shaft 21 and fixed thereto in registration with their respective compartments 11 and 12. The roller 26 is of substantially the same diameter as the roller 23 and is thus larger in diameter than the roller 25. A supply 27 is disposed in the compartment 11 to rest upon the rollers 22 and 25. The term "supply" includes a package of material 28 which is prewound upon a fiber core tube 29 in which is disposed a core weight 30. The material 28 may be of any desired kind or type, the material in the present instance being paper tape. The core weight 30 may be of any suitable material such as iron, to add the desired weight to the supply. Furthermore, the core weight is of a suitable size to be readily inserted in the core tube 29 of one supply and removed therefrom when the material of the supply is exhausted and inserted in a core tube of another supply.

The material from the supply will travel to a processing unit 31, which may be of any desired type or structure, to utilize the material for a given purpose or to treat the material in any desired manner. The detailed structure of the processing unit is not of great importance in the present invention other than the provision of driving means for the material including a motor 32 and a unit or means to affect the material disposed between the supply and takeup. A takeup, indicated generally at 33, is disposed in the compartment 12 and rests upon the rollers 23 and 26. The term "take-up" includes in its meaning material 34 received from the processing unit 31, a fiber tube 35 upon which the material 34 is wound, and a core weight 36 removably disposed in the core tube 35. Separate reference numerals have been applied to the material of the supply and takeup. Although it may be of the same material throughout, it is in one condition prior to reaching the processing unit and in a different condition subsequent thereto.

During the operation of the apparatus (Figs. 1 to 4 inclusive) through the driving of the processing unit 31 in the direction of the arrow, it will be apparent, by viewing Fig. 2, that the material 28 from the supply is drawn therefrom around the roller 22 and over the roller 25, rotating the latter in the direction of its arrow and thus rotating the supply as indicated by its arrow. As the material leaves the processing unit or driving means 31, it becomes a part of the takeup material 34 and passes upwardly around the free rotating roller 23, and onto the takeup 33. During this travel of the material through the action of the driving means or unit 31, the material is pulled from the supply over the serrated roller 25, causing rotation of this roller, and through the connection of the shaft 21 with the serrated roller 26, a positive drive is transmitted to the latter. Thus the supply 27 and the takeup 33 are supported entirely in their compartments of the receptacle by their respective pairs of rollers, each roller performing its given function and tending in certain instances to affect the other roller connected thereto through their companion shaft. For example, the shaft 20 and roller 22 assist in supporting the supply 27, the roller acting as a travel guide for the material as it is taken off the supply.

The roller 25 provides the other half of the support for the supply but acts as a travel guide for the material from the roller 22 to the driving means or unit 31. It also assists in creating a brake drag to the supply through the reverse direction of travel of the material at the roller 25 and the supply. This is due to the fact that the supply is caused to travel counterclockwise, as indicated by its arrow, while the material passing around the roller 25 is moving in the reverse direction. Thus a self-imposed tension in the material is created between the supply and the processing unit. This tension in the material will be somewhat constant in view of the fact that, as the weight of the supply decreases through the paying off of the material therefrom, the lever arm of the supply at the rollers also decreases, tending to maintain the tension constant. The tension may be varied, if desired, by varying the core weight 30.

The takeup 33 is positively driven through the serrated roller 26, and through this means the material is wound upon the takeup as it passes over the roller 23 from the driving means or unit 31. The rollers 23 and 26 are larger than their companion rollers 22 and 25 to create an overdrive of the takeup and maintain the tension in the material.

Referring now to the species of the invention shown in Figs. 5 to 8 inclusive, the structure shown herein is identical with the species shown in Figs. 1 to 4 inclusive with but a few exceptions, namely the changing of the driving means from the processing unit to one set of rollers, and the direction of travel of the material. A receptacle 40, having compartments 41 and 42 formed by a central partition 44, has lower portion curved as at 45 and is provided with an open lower end 46 for both compartments. Brackets 47, integral with the receptacle, provide bearings 48 in pairs adjacent the open end 46. A shaft 49, rotatably supported in one pair of bearings 48, has smooth-surfaced rollers 50 and 51 fixedly mounted thereon adjacent the compartments 41 and 42 respectively. A drive shaft 52, driven by a motor 53, is journalled in the other pair of bearings 48 and has a smooth-surfaced roller 54 and a serrated roller 55 disposed thereon adjacent the compartments 41 and 42 respectively, the roller 54 being free on the shaft while the roller 55 is fixed thereto. The processing unit in this instance is indicated at 57. A supply indicated generally at 58 is identical with the supply 27 and includes a material 59, a fiber core tube 60 and a core weight 61. A takeup indicated generally at 62 includes a material 63, a fiber core tube 64 and a core weight 65.

In this embodiment the material, as illustrated in Fig. 5, is drawn from the supply through the driving effect of the serrated roller 55 (Figs. 5 and 7) pulling the material about the processing unit 57 and the smooth-surfaced rollers 54 and 51 in the directions of their arrows. The roller 50 is rotated by the material 59 assisted by the rotation of the roller 51 and companion shaft 49 during rotation of the takeup 62. Although the roller 54 travels opposite the drive roller 55, the former is free to rotate on its shaft 52. The material is thus pulled about the processing unit 57, where the material is processed or used as desired. The processing unit 57 is illustrated in Fig. 7. The material then having been changed by the processing unit and identified by reference numeral 63 passes upwardly around the serrated roller 55 and onto the takeup 62 assisted by the roller 51.

In this embodiment the same result is accomplished through the action on the material of the supply and that of the takeup. The material in passing between the supply and the roller 54 in a direction contrary to the supply (Fig. 6), receives a given tension therein which is maintained and created by the force of the supply on the material at this point coupled with the variation in the lever arm of the supply as the material is removed from the supply. Furthermore, the takeup 62 is positively driven through the serrated roller 55, causing the material from the processing unit to continue to the takeup.

In each embodiment or species of the invention both the supply and the takeup are supported by their pairs of rollers regardless of the size of either the supply or the takeup. In this manner the axes of the supply and takeup vary in position, that of the supply moving downwardly as the material thereof pays off to the unit, while the axis of the takeup moves upwardly while the material builds up thereon.

Although specific improvements of the invention have been shown and described, it will be understood that they are but illustrative and that various modifications may be made therein without departing from the scope and spirit of this invention as defined by the appended claims.

What is claimed is:

1. A material handling apparatus comprising a set of spaced rollers adapted to support a supply of material, shafts for rotatably supporting the rollers, a set of spaced rollers supported by the shafts and adapted to support a takeup, certain of the rollers being fixed to their respective shafts, and driving means to cause advancement of the material from the supply to the takeup and cause rotation of the rollers to cause rotation of the supply and takeup in given directions to respectively pay off and take up the material traveling in a path opposing at one position the said given direction of the supply and in engagement therewith to create a tension in the material.

2. A material handling apparatus comprising a serrated roller adapted to support a takeup, a roller adapted to rotatably support a supply of material extending to the takeup, a shaft supporting the rollers and fixed thereto, and means to cause rotation of the shaft and the rollers thereon to cause rotation of the takeup to withdraw the material from the supply and wind the material thereon.

3. A material handling apparatus comprising a receptacle having open compartments therein for respectively receiving a supply of material and a takeup therefor, means including a roller disposed adjacent each of the compartment openings for respectively supporting the supply and takeup, a shaft for the rollers fixed thereto, and means to cause advancement of the material from the supply over the supply roller to cause rotation thereof to rotate the shaft and takeup roller to rotate the takeup.

4. A material handling apparatus comprising a receptacle, a rotatable supply of material disposed in the receptacle, a rotatable takeup for the material, a roller to support the supply, and means including the roller to advance the material from the supply to the takeup in a given path, a portion of which returns between the roller and the supply, to cause the advancing material to engage the supply in a direction opposing the direction of rotation of the supply to create a tension in the material between the supply and takeup.

5. A material handling apparatus comprising a receptacle, a rotatable supply of material disposed in the receptacle, a rotatable takeup for the material, a roller to support the supply, a partition in the receptacle to separate the supply and takeup for movements thereof relative to each other, and means including the roller to advance the material from the supply to the takeup in a given path, a portion of which returns between the roller and the supply, to cause the advancing material to engage the supply in a direction opposing the direction of rotation of the supply to create a tension in the material between the supply and takeup.

6. A material handling apparatus comprising a rotatable supply of material, a rotatable takeup for the material, means to support the take-up, a roller to support the supply, and means including the roller to advance the material from the supply to the takeup in a given path, a portion of which returns between the roller and the supply, to cause the advancing material to engage the supply in a direction opposing the direction of rotation of the supply to create a tension in the material between the supply and takeup.

7. A material handling apparatus comprising a receptacle having adjacent compartments therein open at their lower ends, a supply of material freely rotatable in one of the compartments, a takeup for the material freely rotatable in the other compartment, sets of rollers for rotatably supporting the supply and takeup disposed adjacent the open lower ends of the said compartments, and means to cause advancement of the material from the supply to the takeup in a given path about the rollers a portion of which returns to engage the supply at one of the rollers in a direction opposing the direction of rotation of the supply to create a tension in the material between the supply and the takeup.

8. A material handling apparatus comprising a rotatable supply of material, a rotatable takeup for the material, spaced rollers for supporting the supply, shafts for rotatably supporting the rollers, means for supporting the takeup, and means to withdraw the material from the supply about one of the rollers, to cause rotation of the supply in a given direction, and pull the material between the other roller and the supply in a direction opposing the direction of rotation of the supply to create a tension in the material between the supply and takeup.

9. A material handling apparatus comprising a rotatable supply of material, a rotatable takeup for the material, spaced rollers for supporting the supply, shafts for rotatably supporting the rollers, a roller for supporting the takeup, and means to cause rotation of the takeup roller to cause rotation of the takeup to withdraw material from the supply about one of the rollers therefor, to cause rotation of the supply in a given direction, and pull the material between the other roller for the supply and the supply in a direction opposing the direction of rotation of the supply to create a tension in the material between the supply and takeup.

YVES A. BOUGET.